US012259667B2

(12) United States Patent
Shimoi

(10) Patent No.: US 12,259,667 B2
(45) Date of Patent: Mar. 25, 2025

(54) DEVELOPER REPLENISHING CONTAINER AND METHOD OF REUSING DEVELOPER REPLENISHMENT CONTAINER

(71) Applicant: CANON KABUSHIKI KAISHA, Tokyo (JP)

(72) Inventor: Yasuhiro Shimoi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/512,154

(22) Filed: Nov. 17, 2023

(65) Prior Publication Data

US 2024/0201616 A1 Jun. 20, 2024

(30) Foreign Application Priority Data

Dec. 19, 2022 (JP) ................................ 2022-201768

(51) Int. Cl.
*G03G 15/08* (2006.01)

(52) U.S. Cl.
CPC ..... *G03G 15/0886* (2013.01); *G03G 15/0868* (2013.01); *G03G 15/0894* (2013.01)

(58) Field of Classification Search
CPC ........... G03G 15/0865; G03G 15/0867; G03G 15/0868; G03G 15/0886; G03G 15/0894; G03G 2215/0678
See application file for complete search history.

(56) References Cited

U.S. PATENT DOCUMENTS

2004/0126131 A1* 7/2004 Numagami ........ G03G 15/0894 399/109
2004/0131383 A1* 7/2004 Fujita ................ G03G 15/0894 399/109
2012/0219328 A1 8/2012 Oda et al.
2019/0339633 A1* 11/2019 Yasuda ............. G03G 15/0886

FOREIGN PATENT DOCUMENTS

JP H11149209 A 6/1999
JP 2006235046 A 9/2006
JP 2012194545 A 10/2012
JP 2013250474 A 12/2013
JP 2021135451 A 9/2021
JP 2022034053 A 3/2022

* cited by examiner

*Primary Examiner* — Hoang X Ngo
(74) *Attorney, Agent, or Firm* — ROSSI, KIMMS & McDOWELL LLP

(57) ABSTRACT

A developer replenishing container configured to be detachably attachable to a developer replenishing device and to replenish developer via the developer replenishing device is disclosed. The developer replenishing container includes: a developer replenishing portion with a replenishing opening; and a shutter with at least one shutter opening that can communicate with the replenishing opening, the shutter being configured to open and close the replenishing opening according to attaching and detaching operations of the developer replenishing container, wherein the shutter is movable between a sealing position where the replenishing opening is sealed, a replenishing position where the shutter opening faces the replenishing opening to replenish developer from the developer replenishing container, and a filling position where the developer replenishing container is filled with developer without sealing the replenishing opening.

13 Claims, 13 Drawing Sheets

DEVELOPER REPLENISHING CONTAINER AND METHOD OF REUSING DEVELOPER REPLENISHMENT CONTAINER

BACKGROUND OF THE INVENTION

Field of the Invention

This invention relates to a developer replenishing container that is detachably attachable to an image forming apparatus and a method for reusing a developer replenishing container.

Description of the Related Art

Conventionally, a fine powder developer is used electrophotographic image forming apparatuses such as coping machines. In this type of image forming apparatuses, the developer is consumed during image formation and is replenished from a removable developer replenishing container.

In recent years, there has been an accelerating trend to reuse regularly consumable components such as developer replenishing containers by collecting and recycling them (Japanese Patent Publication No. 11-149209, Japanese Patent Publication No. 2006-235046, Japanese Patent Publication No. 2021-135451). Especially, the reuse of a developer replenishing container by refilling it with developer is proposed (Japanese Patent Publication No. 2006-235046) and it is expected that the reuse of developer replenishing containers will be actively performed in the future.

However, reusing a developer replenishing container requires more steps to perform than manufacturing a new developer replenishing container such as collecting the used replenishing container, disassembling the container, assessing the condition of the container, and cleaning the container before refilling the container with developer, which leads to a higher cost of the provision of a developer replenishing container.

SUMMARY OF THE INVENTION

A representative configuration of the present invention is a developer replenishing container configured to be detachably attachable to a developer replenishing device and to replenish developer via the developer replenishing device, the developer replenishing container comprising:

a developer replenishing portion with a replenishing opening; and a shutter with at least one shutter opening that can communicate with the replenishing opening, the shutter being configured to open and close the replenishing opening according to attaching and detaching operations of the developer replenishing container, wherein the shutter is movable between a sealing position where the replenishing opening is sealed, a replenishing position where the shutter opening faces the replenishing opening to replenish developer from the developer replenishing container, and a filling position where the developer replenishing container is filled with developer without sealing the replenishing opening.

Further features of the present invention will become apparent from the following description of exemplary embodiments with reference to the attached drawings.

DESCRIPTION OF THE EMBODIMENTS

Hereinafter, with reference to the drawings, a developer replenishing container and a developer replenishing system according the present invention will be specifically described. In the following, unless otherwise stated, various elements of the configuration of the developer replenishing container can be replaced with other known elements that perform similar functions within the scope of the concept of the invention. Namely, unless otherwise stated, there is no intention to limit the invention only to the configurations of the developer replenishing containers described in the Embodiments described below.

Embodiment 1

First, the basic configuration of the image forming apparatus 1 will be described. Then, the configurations of the four developer replenishing devices 3 and the four developer replenishing containers 4 that constitute the developer replenishing system 2 installed in the image forming apparatus 1 will be described in turn.

(Image Forming Apparatus)

Figure 1:
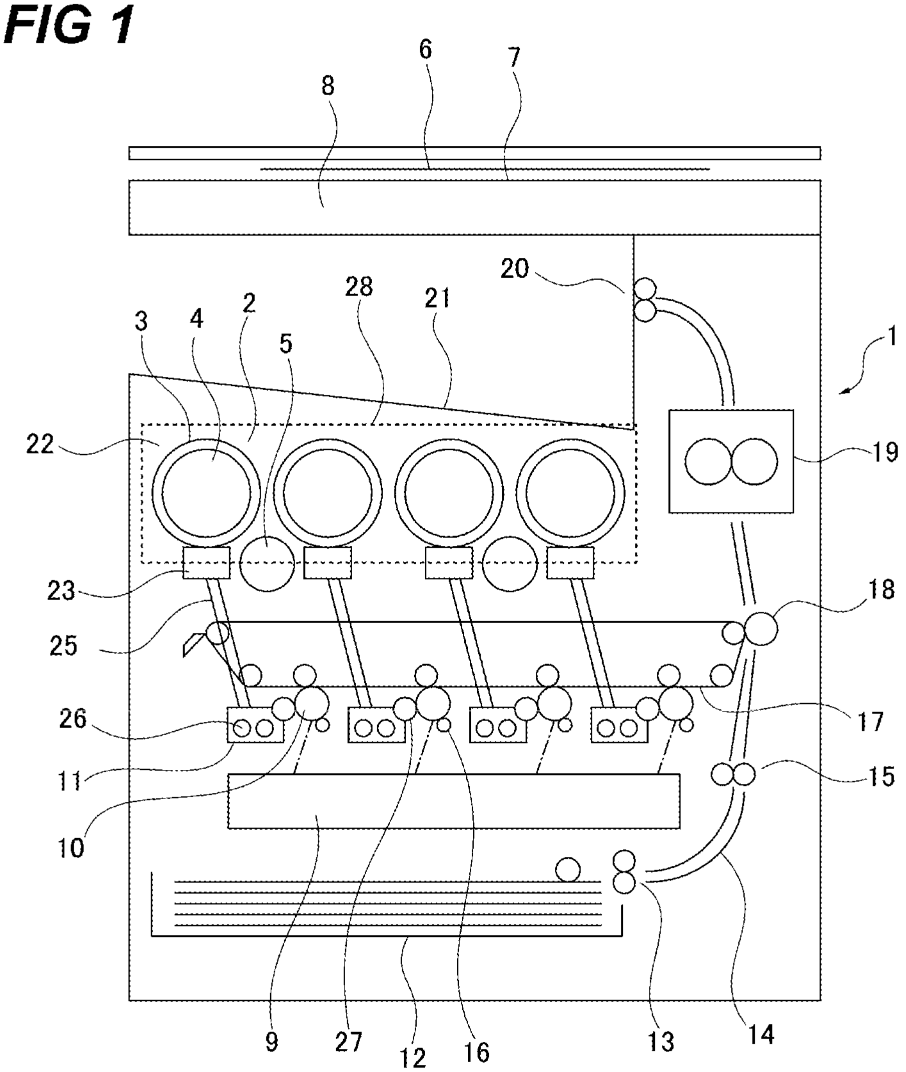
FIG. 1 is a schematic diagram showing a cross-sectional view of an image forming apparatus.

The configuration of the image forming apparatus 1, which is a copying machine employing the electrophotographic system (electrophotographic image forming apparatus), of Embodiment 1 of the present invention will be described using FIG. 1. The image forming apparatus 1 is equipped with the developer replenishing devices 3. The developer replenishing containers 4 are detachably (removably) attached to the developer replenishing devices 3. FIG. 1 is a schematic diagram showing a cross-sectional view of the image forming apparatus.

In FIG. 1, the reference numeral "1" indicates the main body of the copying machine (hereinafter referred to as the image forming device or main body of the apparatus). The document 6 to be copied is placed on the document base glass 7. The image information of the document 6 placed on the document base glass 7 is read by the reading portion 8. Each photosensitive drum 10 is irradiated with a laser beam output from the laser scanner 9 based on the data of the document 6 obtained as image information by the reading portion 8. As a result, an electrostatic latent image is formed on each photosensitive drum 10. This electrostatic latent image is visualized using toner (one-component magnetic toner) as the developer (dry powder) by the developing device 11 of a dry type (one-component developing device).

In this embodiment, a configuration with a one-component magnetic toner as the developer to be replenished from the four developer replenishing containers 4 will be described. However, not only this configuration but also the following configuration is acceptable.

Specifically, when using a one-component developing device for the development with one-component nonmagnetic toner, the one-component nonmagnetic toner is replenished as the developer. On the other hand, when using a two-component developing device for the development with a two-component developer in which magnetic carrier and nonmagnetic toner are mixed, the nonmagnetic toner is replenished as the developer. In this case, the developer may be replenished with magnetic carrier as well as nonmagnetic toner.

The recording media (hereinafter also referred to as sheets) S are stored in the cassette 12 located at the bottom of the image forming apparatus 1. The recording medium is not limited to paper, but can be used or selected as appropriate, for example, an OHP sheet.

The sheets S accommodated in the cassette 12 are fed one by one by the feeding and separating device 13. The sheet S conveyed by the feeding and separating device 13 is then conveyed through the conveying portion 14 to the registration rollers 15. The sheet S is conveyed by the registration rollers 15 with the rotation of the photosensitive drum 10 being synchronized with the scanning timing of the laser scanner 9.

Each photosensitive drum 10 is charged by each charging device 16 and an electrostatic latent image is formed by the scanning of the laser scanner 9 as described above. A one-component magnetic toner is supplied from the developing device 11 to the electrostatic latent image formed on the photosensitive drum 10 to form a toner image on the photosensitive drum 10.

The toner image formed on each photosensitive drum 10 is transferred to the transfer belt 17. This image formation process is repeated for four colors, yellow (Y), magenta (M), cyan (C), and black (K), thereby forming a four-color overlapping toner image on the transfer belt 17.

The toner image formed on the transfer belt 17 is transferred to the sheet S at the nip (secondary transfer portion) between the transfer roller 18 and the transfer belt 17. The sheet S on which the toner image has been transferred is conveyed to the fixing portion 19, where the toner image is fixed by heat and pressure. The sheet S is then discharged from the discharge portion 20 onto the discharge tray 21 to complete the image forming operation.

(Developer Replenishing System)

Figure 2:
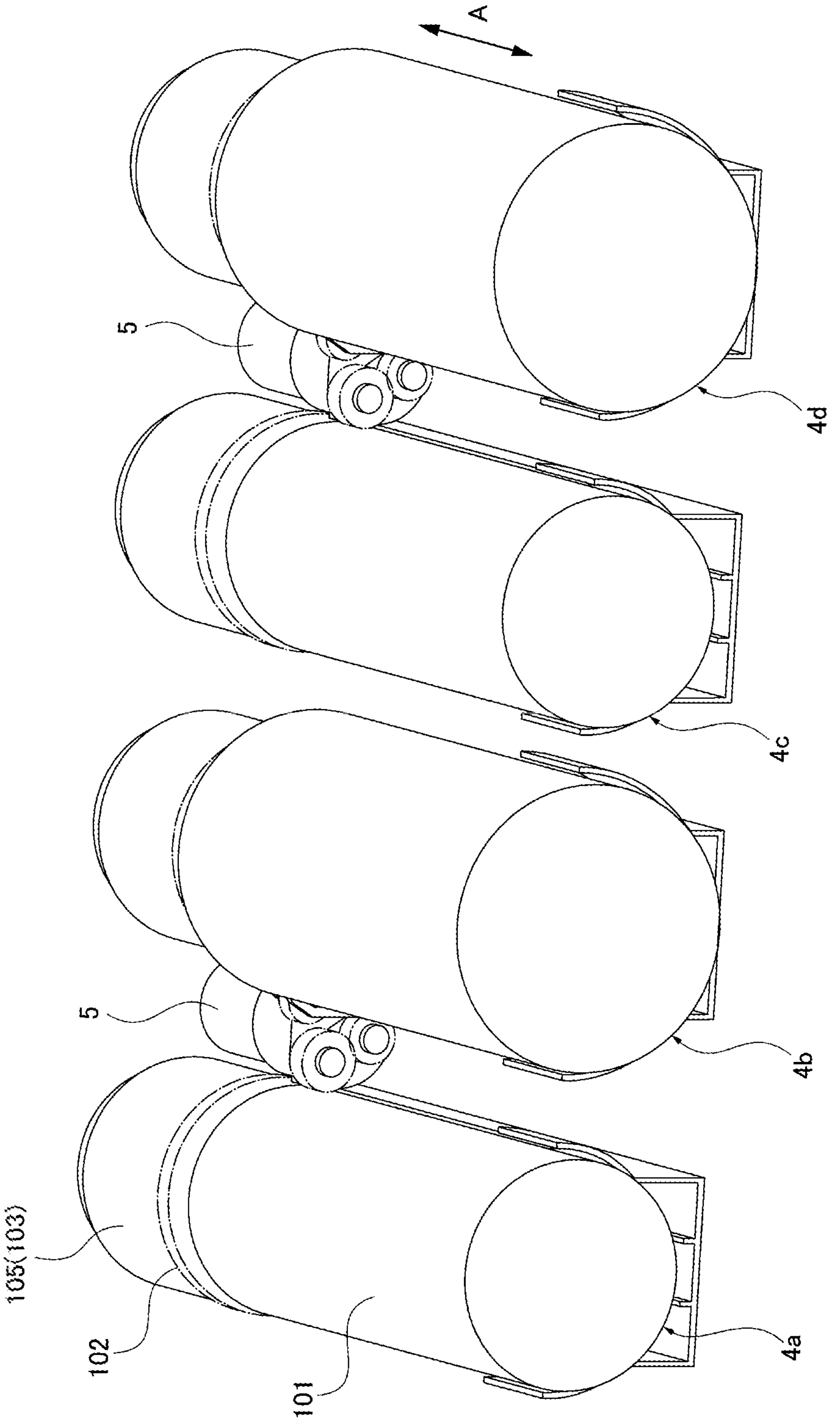
FIG. 2 is a diagram showing an external view of developer replenishing devices and developer replenishing containers.
Figure 3:
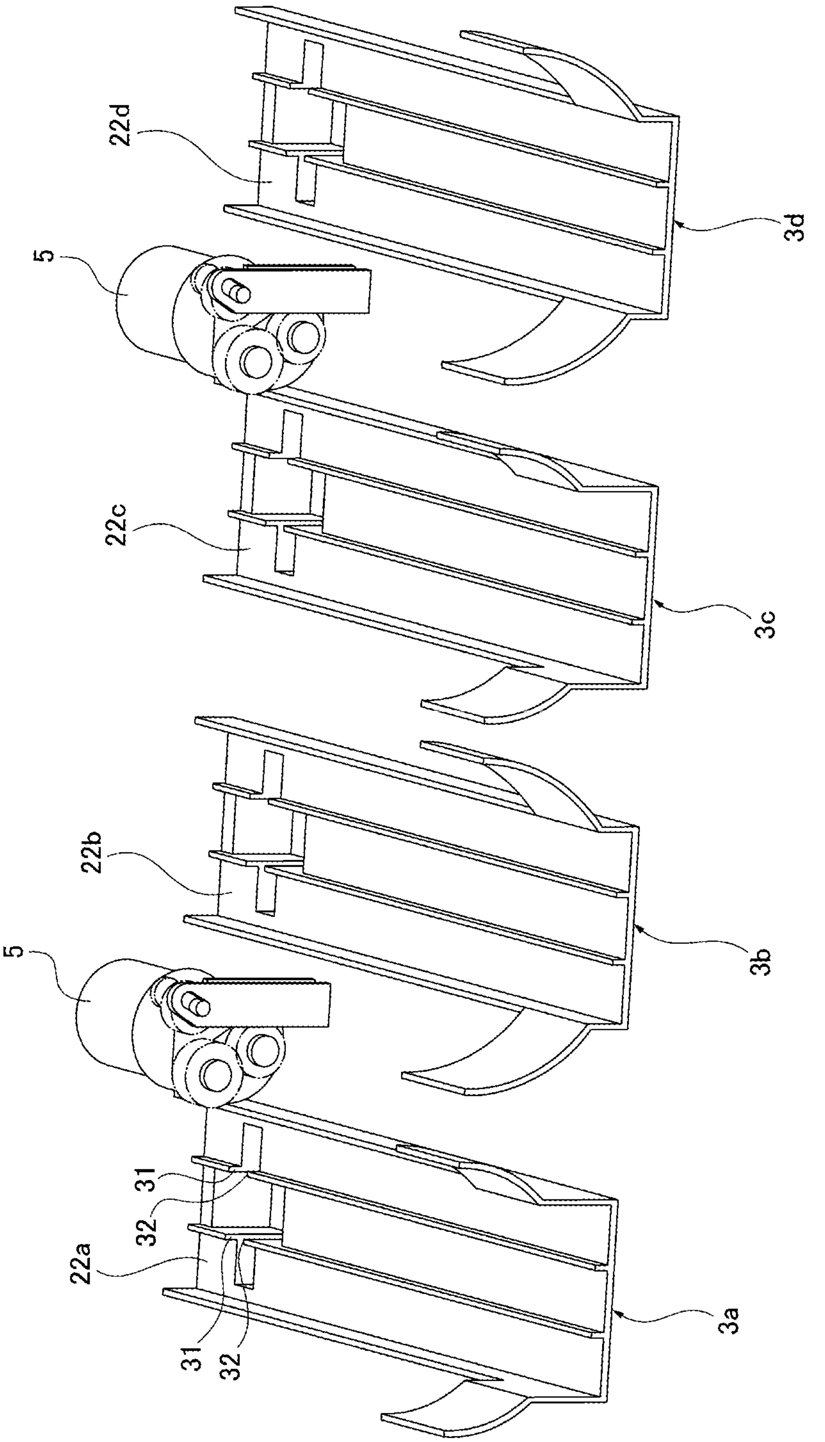
FIG. 3 is a diagram showing an external view of the developer replenishing devices.

Next, the developer replenishing system 2 will be described using FIGS. 1, 2 and 3. The developer replenishing system 2 has the four developer replenishing devices 3*a* to 3*d* and the four developer replenishing containers 4*a* to 4*d*. FIG. 2 shows an external view of the developer replenishing devices 3*a* to 3*d* and the developer replenishing containers 4*a* to 4*d*. FIG. 3 shows an external view of the developer replenishing devices 3*a* to 3*d*.

Since the developer replenishing devices 3*a* to 3*d* have a common configuration except that the different colors of toner are used, suffixes a to d will be omitted hereinafter and the developer replenishing devices 3*a* to 3*d* are referred to as developer replenishing device 3. The same applies to developer replenishing containers 4*a* to 4*d*. Although the four developer replenishing devices 3*a* to 3*d* and the four developer replenishing containers 4*a* to 4*d* are shown here as the components of the developer replenishing system 2, the number of the developer replenishing devices and the developer replenishing containers should be appropriately set and is not limited to four.

The developer replenishing device 3 has the mounting portion 22 (mounting space) where the developer replenishing container 4 is removably (in a detachably attachable manner) mounted, and the hopper 23 (see FIG. 1) that temporarily stores the developer discharged from the developer replenishing container 4. The developer replenishing container 4 is configured to be detached from and attached to the mounting portion 22 in direction A as shown in FIG. 2. Namely, the developer replenishing container 4 is attached to and detached from the mounting portion 22 such that its longitudinal direction (the direction of the rotational axis, the direction of axis P shown in FIG. 4) is approximately aligned with this direction A.

The developer replenishing device 3 has the drive mechanisms 5 that drive the developer replenishing containers 4, as shown in FIGS. 2 and 3. The drive mechanisms 5 apply a rotational driving force to the developer replenishing containers 4 that are set in the mounting portion 22. The drive mechanisms 5 are configured to have their operations controlled by an unshown control unit (CPU).

The configuration is exemplified here in which the single drive mechanism 5 rotates and drives two developer replenishing containers 4, but the invention is not limited to this configuration. The drive mechanism 5 can be provided for each developer replenishing container 4.

The mounting portion 22 shown in FIG. 3 is provided with a rotational direction restricting portion (not shown) for restricting the movement of the container frame 103 in the rotational direction (direction B shown in FIG. 4) by the rotational direction restricting portion abutting on the container frame 103 of the developer replenishing container 4 when the developer replenishing container 4 is mounted.

The mounting portion 22 has a developer receiving opening (not shown) for receiving developer discharged from the developer replenishing container 4 when the developer replenishing container 4 is mounted. In this case, the developer receiving opening communicates with the shutter opening 106*a* (see FIG. 7B) of the developer replenishing container 4 described below.

When the developer should be replenished, a rotational driving force is transmitted to the developer replenishing container 4 mounted on the mounting portion 22 by the drive mechanism 5. When the drive mechanism 5 transmits the rotational driving force, the developer is discharged from the developer replenishing container 4, and the developer is supplied to the hopper 23 of the developer replenishing device 3.

The developer discharged from the developer replenishing container 4 and stored in the hopper 23 is conveyed to the developing device 11 via the replenishing path 25.

The developer conveyed to the developing device 11 is further conveyed to the developing roller 27 by the agitating and conveying member 26, and is supplied from the developing roller 27 to the photosensitive drum 10 as needed during image formation.

(Mounting and Removing of Developer Replenishing Container)

Next, the mounting and removing of the developer replenishing container 4 will be described.

First, an operator inserts the developer replenishing container 4 into the mounting portion 22 of the developer replenishing device 3 to mount the developer replenishing container 4 to the mounting portion 22 after opening a replacing cover (not shown), which is a part of the exterior cover of the image forming apparatus 1. Then, the operator closes the replacing cover to complete the mounting operation. As a result, the developer replenishing container 4 is set in a state in which the developer replenishing container 4 can replenish the developer to the developer replenishing device 3.

On the other hand, when the operator replaces the developer replenishing container 4, the operator first removes the developer replenishing container 4 by performing the opposite operation from that used for mounting. That is, for example, when the developer in the developer replenishing container 4 is empty, the operator opens the replacing cover (not shown) and removes the developer replenishing container 4 from the mounting portion 22 of the developer replenishing device 3. Then, a new developer replenishing container 4, which has been prepared in advance, is inserted into the mounting portion 22 of the developer replenishing device 3. The operator then closes the replacing cover to complete the replacement operation from removal to remount of the developer replenishing container 4. The developer replenishing container 4 is then set in a state in which the developer replenishing container 4 can replenish the developer to the developer replenishing device 3.

(Replenishment Operation of Developer Replenishing Container)

Figure 4:
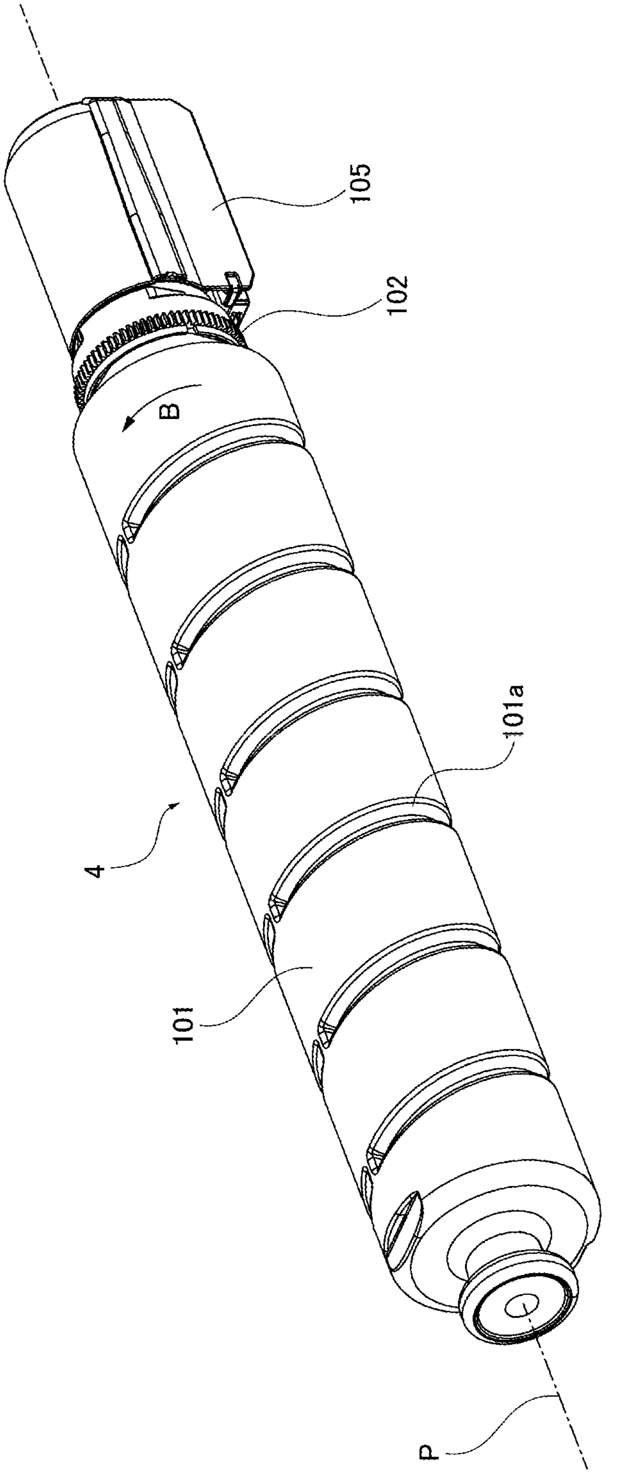
FIG. 4 is a diagram showing an external view of a developer replenishing container.
Figure 5:
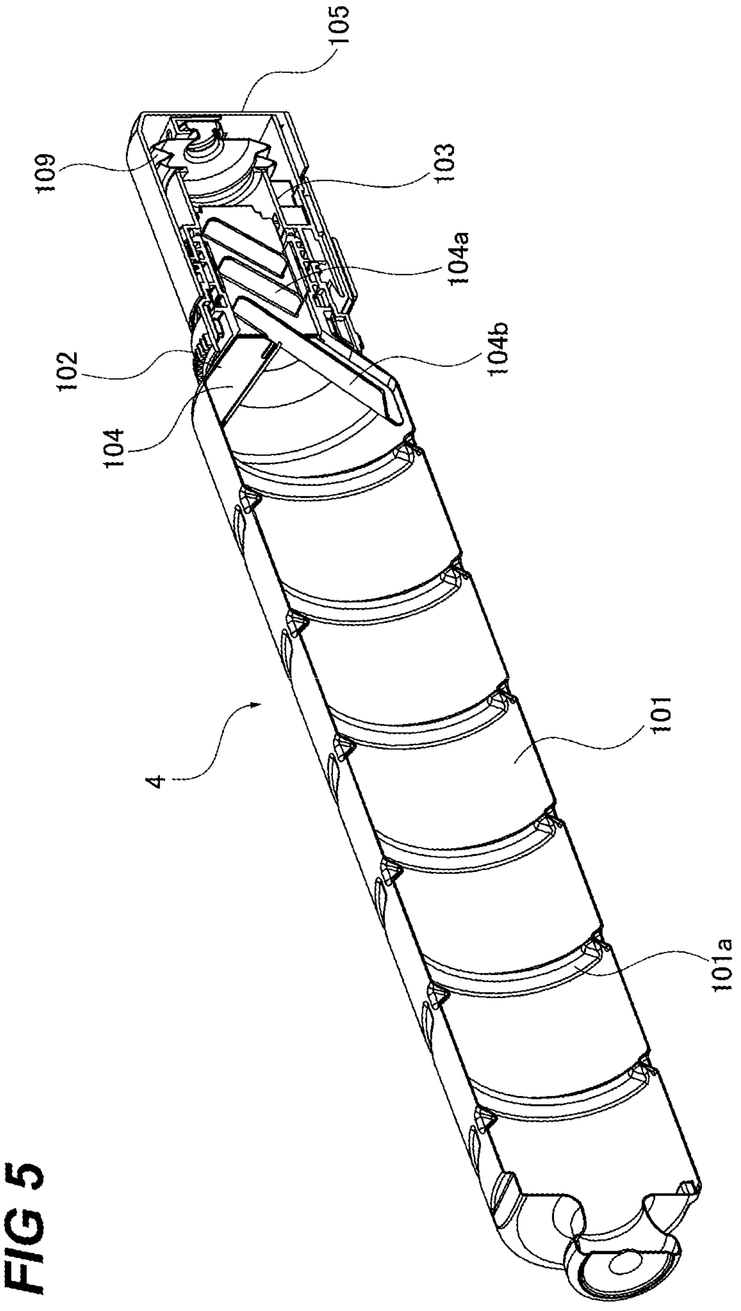
FIG. 5 is a diagram showing a cross-sectional view of the developer replenishing container.
Figure 6:
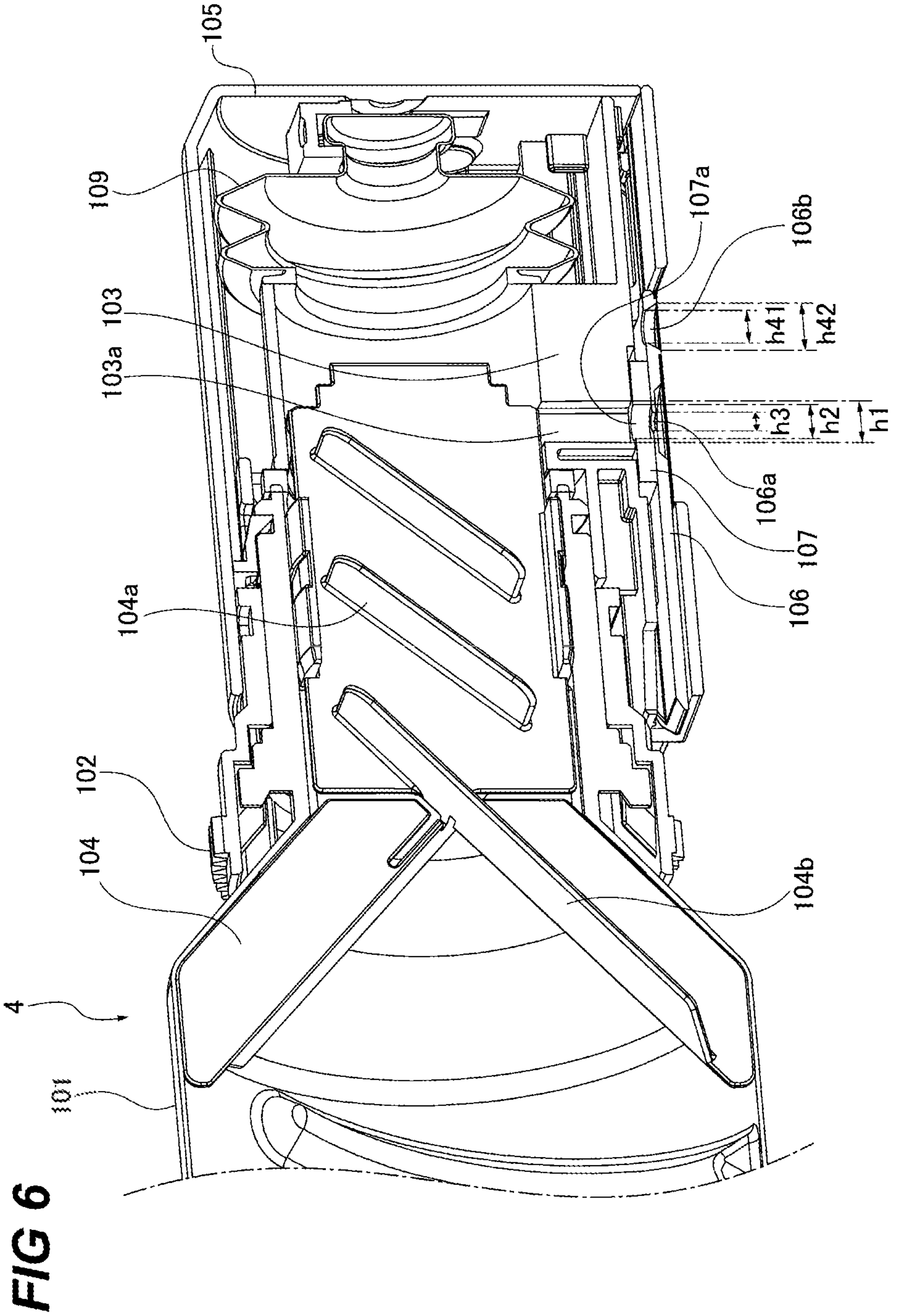
FIG. 6 is a diagram showing a cross-sectional view of the vicinity of a container frame of the developer replenishing container.

The replenishing operation of the developer replenishing containers 4*a* to 4*d* will be described using FIGS. 4, 5 and 6. FIG. 4 shows an external view of the developer replenishing container. FIG. 5 shows a cross-sectional view of the developer replenishing container. FIG. 6 shows a cross-sectional view of a container frame side of the developer replenishing container.

The developer replenishing containers 4*a* to 4*d* accommodate yellow (Y) toner, magenta (M) toner, cyan (C) toner, and black (K) toner, respectively. The configurations of the developer replenishing containers 4*a* to 4*d* are the same as each other except for toner color and the suffixes a to d are omitted in the following description.

The developer replenishing container 4 mainly includes the developer container 101, the drive input gear 102, the container frame 103, the container blade device 104, the container cover 105, the container shutter 106, and the container seal 107. The developer replenishing container 4 is configured to be detachably attachable to the developer replenishing device 3 and to replenish the developer to the developing device 11 through the developer replenishing device 3.

The drive input gear 102 and the container blade device 104 are assembled with the developer container 101. The developer container 101 is configured to rotate integrally with the drive input gear 102 and the container blade device 104.

The developer container 101 is configured to rotate in the direction B around the axis P by the rotation of the drive input gear 102 to which the rotational drive force is transmitted from the drive mechanism 5. Furthermore, the developer container 101 has the spiral-shaped conveying groove 101*a*. Therefore, when the developer container 101 rotates in the B direction, the developer in the developer container 101 is conveyed toward the container frame 103 by the conveying groove 101*a*.

The container blade device 104 has the conveying portion 104*a* and the lifting portion 104*b*. Similar to the developer container 101, the container blade device 104 rotates in the direction B by the rotation of the drive input gear 102. The developer conveyed by the conveying groove 101*a* of the developer container 101 is lifted from the developer container 101 by the lifting portion 104*b* and further conveyed to the container frame 103 by the conveying portion 104*a* to be supplied to the supplying opening 103*a*, which will be described later.

The container frame 103 is mounted to the developer container 101 such that the container frame 103 can be rotated relative to the developer container 101. The container frame 103 is configured not to rotate in the direction B when the rotational drive force is input to the container frame 103 by the drive input gear 102 with the developer container 101 being mounted on the mounting portion 22 of the developer replenishing device 3.

Specifically, when the developer replenishing container 4 is mounted on the developer replenishing device 3, the container frame 103 is restricted (prevented) from rotating in the direction B by a rotation direction restricting portion (not shown) provided on the mounting portion 22. The container frame 103 is held so as not to be rotated in the direction B with respect to the mounting portion 22.

The container frame 103, which works as a developer replenishing portion, is provided with the supply opening 103*a*, which works as a replenishing opening, through which the developer sent from the developer container 101 is replenished to the developer replenishing device 3.

The container shutter 106, the container seal 107, the pump portion 109, the reciprocating member (not shown), and the container cover 105 are assembled with the container frame 103. The pump portion 109 is joined to one end portion of the container frame 103, and the developer container 101 is joined to the other end portion such that the developer container 101 can be relatively rotated. The reciprocating member (not shown) is disposed on the container frame 103 so as to sandwich the pump portion 109. An engagement protrusion (not shown) on the reciprocating member (not shown) is fitted into a cam groove (not shown) of the developer container 101.

When the developer container 101 rotates in the direction B, the cam groove (not shown) of the developer container 101 moves the engagement projection (not shown) in the axial direction, causing the reciprocating member (not shown) to reciprocate in the axial direction. As a result, the pump portion 109, which is joined to the reciprocating member (not shown), is reciprocally moved in the axial direction and functions as a suction and exhaust mechanism that alternately performs suction and exhaust operations through the supply opening 103*a*.

In addition, the container cover 105 is integrally provided to cover the entirety of the container frame 103, the pump portion 109 and the reciprocating member (not shown) described above (not shown) for the purposes of improving the external appearance and protecting the reciprocating member (not shown) and the pump portion 109.

The container seal 107 is disposed on the container frame 103 between the supply opening 103*a* of the container frame 103 and the container shutter 106 described below.

The container seal 107 has the seal opening 107*a* that communicates with the supply opening 103*a*. The container seal 107 is disposed between the supply opening 103*a* of the container frame 103 and the container shutter 106. The container seal 107 is an elastic member for sealing the gap between the container frame 103 and the container shutter 106.

The container shutter 106 is provided on the container frame 103 between the supply opening 103*a* of the container frame 103 and the developer receiving opening 33 of the developer replenishing device 3. The container shutter 106 can slide in the axial direction.

(Configuration of Container Shutter of Developer Replenishing Container)

Next, the configuration of the container shutter 106 of the developer replenishing container 4 according to Embodiment 1 will be described.

The container shutter 106 has at least one shutter opening that can communicate with the supply opening 103*a*. In this embodiment, the container shutter 106 has the first shutter opening 106*a* that can communicate with the supply opening 103*a* and the second shutter opening 106*b* that is larger in diameter than the shutter opening 106*a* and that can communicate with the supply opening 103*a*.

The seal opening 107*a* of the container seal 107 is smaller in diameter than the second shutter opening 106*b* of the container shutter 106.

The container shutter 106 is movable in the direction of the axis P (see FIG. 4) with respect to the developer replenishing container 4, and opens and closes the supply opening 103*a* as the developer replenishing container 4 is attached and removed.

Specifically, the container shutter 106 is movable between the sealing position (FIG. 7A) where the container shutter 106 seals the supply opening 103*a*, the replenishing position (FIG. 7B) where the first shutter opening 106*a* faces the supply opening 103*a* to replenish the developer from the developer replenishing container 4, and the filling position (FIG. 7C) where the developer replenishing container 4 is filled with the developer without sealing the replenishing opening.

Figure 7A:
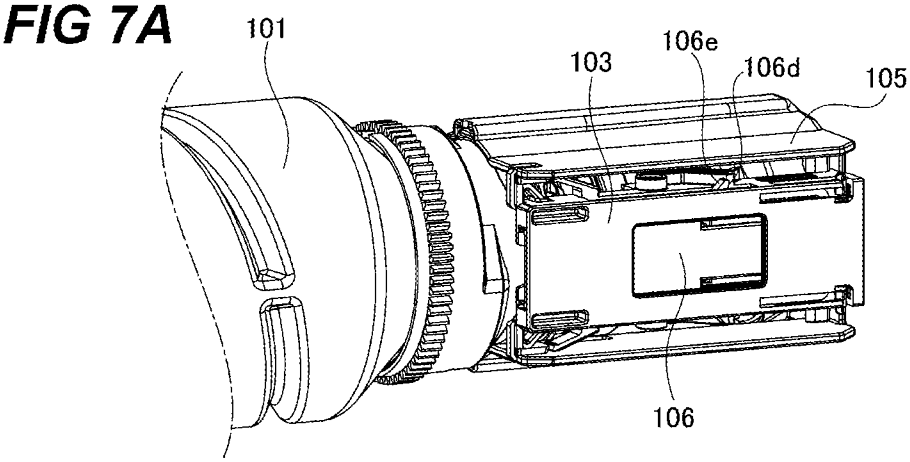
FIGS. 7A, 7B and 7C are a diagram showing an external view of the developer replenishing container according to Embodiment 1.
Figure 7B:
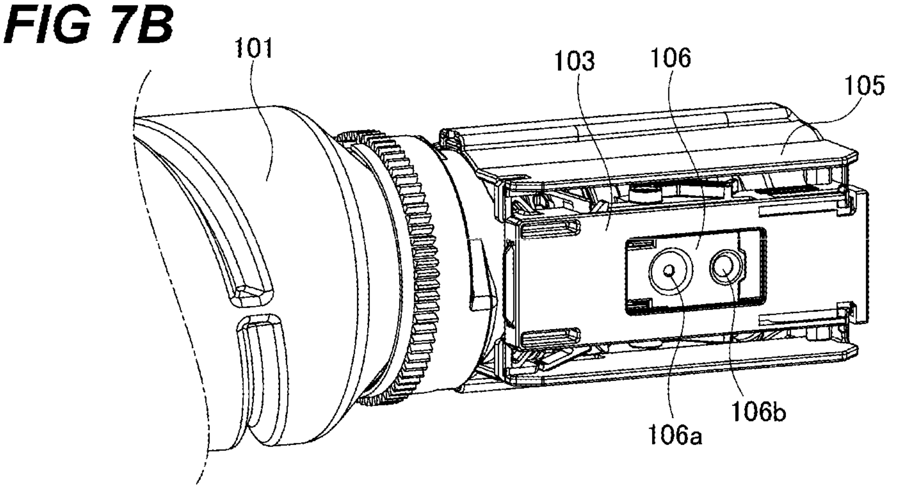
Figure 7C:
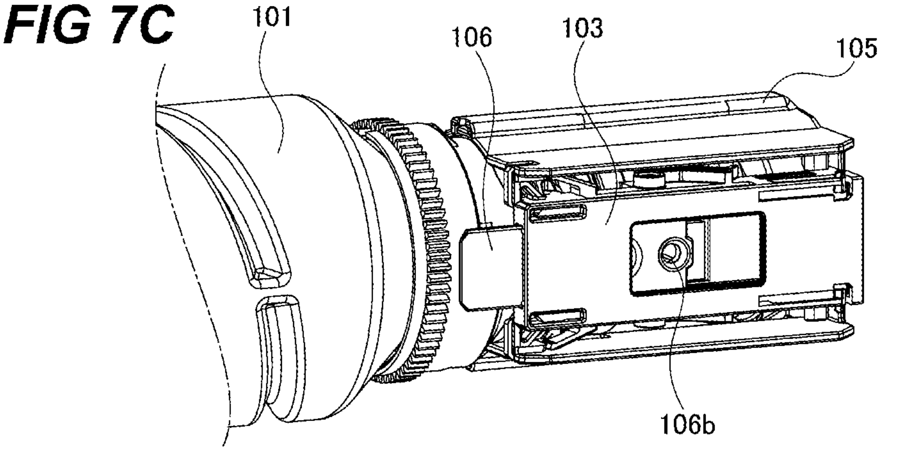

Namely, the container shutter 106 is movable between the sealing position (FIG. 7A), the replenishing position (FIG. 7B), and the filling position (FIG. 7C).

The container shutter 106 has stopper portions (held portions) 106*d*, 106*e* (see FIG. 7A), which are held by the shutter stopper portions 31, 32 (see FIG. 3) of the developer replenishing device 3 during mounting and removing operations of the developer replenishing container 4 so that the developer replenishing container 4 can move relative to the container shutter 106.

The first stopper portion 106*d* engages the first shutter stopper portion 31 of the developer replenishing device 3 during the mounting operation of the developer replenishing container 4 to fix the position of the container shutter 106 relative to the developer replenishing device 3. The second stopper portion 106*e* engages the second shutter stopper portion 32 of the developer replenishing device 3 during the removing operation of the developer replenishing container 4.

The container shutter 106 is in a sealing state in which the supply opening 103*a* (seal opening 107*a*) does not communicate with the shutter opening 106*a* when the developer replenishing container 4 is not mounted on the image forming apparatus 1. Namely, in this sealing state, the container shutter 106 is in the sealing position where the sealing portion, which has no opening as shown in FIG. 7A, faces the supply opening 103*a* and the seal opening 107*a*, so that the supply opening 103*a* (seal opening 107*a*) does not communicate with the shutter opening 106*a*.

When the developer replenishing container 4 is not mounted in the image forming apparatus 1, the container shutter 106 is engaged by a configuration member that maintains the state between the container shutter 106 and the container frame 103 so that the container shutter 106 is held such that the container shutter 106 does not move from the sealing position (sealing state) shown in FIG. 7A.

In mounting the developer replenishing container 4, the first stopper portion 106*d* of the container shutter 106 engages the first shutter stopper portion 31 of the mounting portion 22 to fix the position of the container shutter 106 with respect to the developer replenishing device 3. As a result, the container shutter 106 is disengaged from the configuration member and moves in the axial direction relative to the developer replenishing container 4, and becomes in a discharging state in which the supply opening 103*a* (seal opening 107*a*) communicates with the shutter opening 106*a* as shown in FIG. 7B. Namely, the shutter opening 106*a* of the container shutter 106 is moved to the replenishing position (see FIG. 7B) where the shutter opening 106*a* faces the supply opening 103*a* and the seal opening 107*a* so that the supply opening 103*a* (seal opening 107*a*) communicates with the shutter opening 106*a* in the discharging state. As a result, the developer can be supplied from the developer replenishing container 4 to the developer replenishing device 3.

The developer supplied to the supply opening 103*a* is discharged out of the container through the seal opening 107*a* of the container seal 107 and the shutter opening 106*a* of the container shutter 106. Then, the developer is supplied to the hopper 23 of the developer replenishing device 3 to be used for the image formation as described above.

To prevent developer contamination outside the developer container 101, the opening widths of the supply opening 103*a* of the container frame 103, the seal opening 107*a* of the container seal 107, and the shutter opening 106*a* of the container shutter 106 have the following relationship. The supply opening 103*a* of the container frame 103, the seal opening 107*a* of the container seal 107, and the shutter opening 106*a* of the container shutter 106 are each a round hole, and the opening width is the diameter of each round hole in the axial direction.

Namely, the opening width h1 of the supply opening 103*a* of the container frame 103 is larger than the opening width h2 of the seal opening 107*a* of the container seal 107. The opening width h2 of the seal opening 107*a* of the container seal 107 is larger than the opening width h3 of the shutter opening 106*a* of the container shutter 106 (see FIG. 6).

This means that the opening width h1 of the supply opening>the opening width h2 of the seal opening>the opening width h3 of the shutter opening.

This configuration allows the developer to be retained on the interior side of the developer container 101, which prevents external developer contamination.

During the removing operation of the developer replenishing container 4, the container shutter 106 is moved to the sealing position (sealing state) shown in FIG. 7A by the second stopper portion 106*e* engaging with the second shutter stopper portion 32 of the developer replenishing device 3, and is held in the sealing position (sealing state).

Next, the steps of reusing the developer replenishing container 4 will be described, in which the used developer replenishing container 4 is collected and the developer replenishing container 4 is refilled with developer.

The collected developer replenishing container 4 is reused through the step of moving the container shutter 106 to the filling position (FIG. 7C) and the step of filling the developer replenishing container 4 with developer in the state where the container shutter 106 is moved to and kept at the filling position.

Specifically, when the developer replenishing container 4 (developer container 101) is to be refilled with the developer, the container shutter 106 is moved using, for example, a jig (not shown) to be in the state for refilling so that the shutter opening 106*b* communicates with the supply opening 103*a* (seal opening 107*a*) as shown in FIG. 7C. Namely, the container shutter 106 is moved to the filling position (see FIG. 7C) where the shutter opening 106*b* faces the supply opening 103*a* and the seal opening 107*a*, so that the supply opening 103*a* (seal opening 107*a*) communicates with the shutter opening 106*b*. This allows the developer to be refilled into the developer replenishing container 4.

The second shutter opening 106*b* is formed such that as compared with the diameter h41 on the container frame 103 side, i.e., the developer replenishing portion side, the diameter h42 on the opposite side is larger (see FIG. 6). Namely, the shutter opening 106*b* has a tapered inner surface such that the diameter increases from the inside of the developer replenishing container 4 toward the outside. Further, the shutter opening 106*b* of the container shutter 106 has widths larger than that of the shutter opening 106*a* (h41, h42>h3). This allows the developer to be refilled while minimizing parts replacement, even when the small-diameter shutter opening 106*a* is used to prevent contamination.

As mentioned above, according to Embodiment 1, by moving the container shutter 106 to the filling position shown in FIG. 7C, it is possible to refill the developer replenishing container 4 with developer from the shutter opening 106*b*, which communicates with the supply opening 103*a* (seal opening 107*a*). This eliminates the process of disassembling the developer replenishing container 4, so that the steps and costs for reuse are minimized when the developer replenishing container is reused by refilling it with the developer.

Embodiment 2

Next, the developer replenishing container according to Embodiment 2 will be described using FIG. 8. The configuration of the image forming apparatus 1 including the developer replenishing device 3 is the same as that in Embodiment 1 described above, so the description thereof will be omitted. Further, the configuration of the developer replenishing container is also the same as that of Embodiment 1 described above, except for the configuration described below, so the same reference symbols will be attached to the components with equivalent functions and the description thereof will be omitted.

In the Embodiment 1, the container shutter 106 has the first shutter opening 106*a* and the second shutter opening 106*b* that can communicate with the supply opening 103*a*. In this Embodiment 2, the container shutter 106 has only one shutter opening 106*a* which can communicate with the supply opening 103*a*.

(Configuration of Container Shutter of Developer Replenishing Container)

Next, the configuration of the container shutter 206 of the developer replenishing container 4 for Embodiment 2 will be described.

The container shutter 206 has the shutter opening 206*a* that can communicate with the supply opening 103*a*. Further, the container shutter 206 is provided with the recessed portion 206*c* that is recessed in the inner direction of the container shutter 206.

The container shutter 206 is movable in the direction of the axis P (see FIG. 4) with respect to the developer replenishing container 4, and opens and closes the supply opening 103*a* as the developer replenishing container 4 is attached and removed.

Specifically, the container shutter 206 is movable between the sealing position (FIG. 8A) where the container shutter 206 seals the supply opening 103*a*, the replenishing position (FIG. 8B) where the shutter opening 206*a* faces the supply opening 103*a* to replenish the developer from the developer replenishing container 4, and the filling position (FIG. 8C) where the developer replenishing container 4 is filled with the developer without sealing the supply opening 103*a*.

Figure 8A:
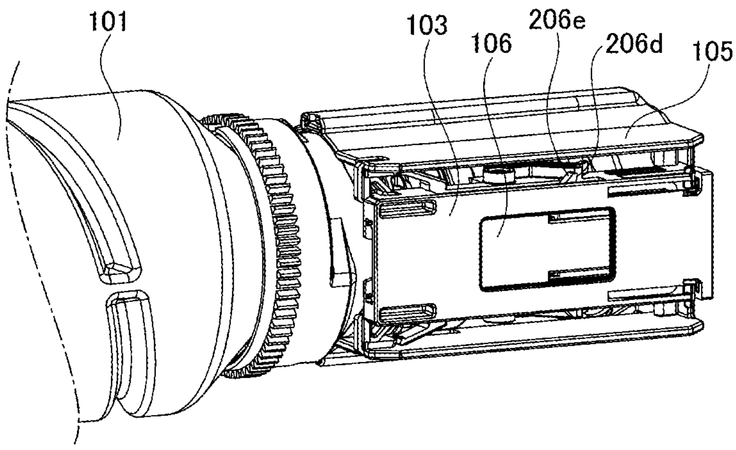
FIGS. 8A, 8B and 8C are a diagram showing an external view of the developer replenishing container according to Embodiment 2.
Figure 8B:
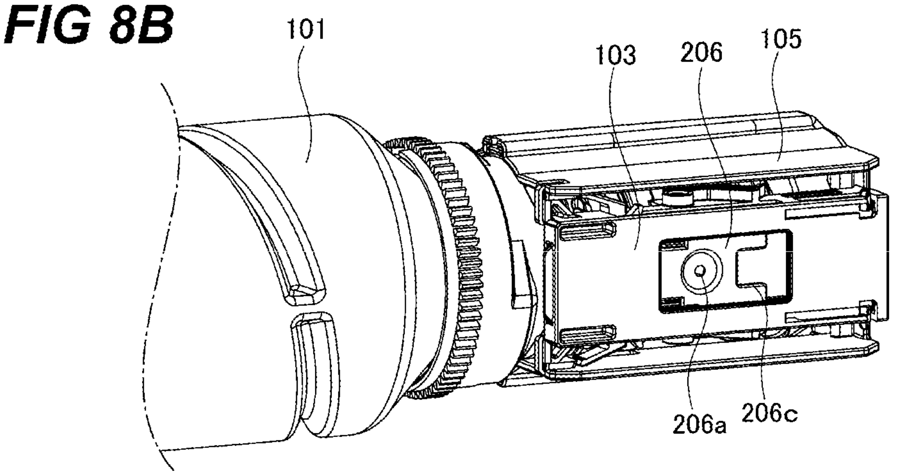
Figure 8C:
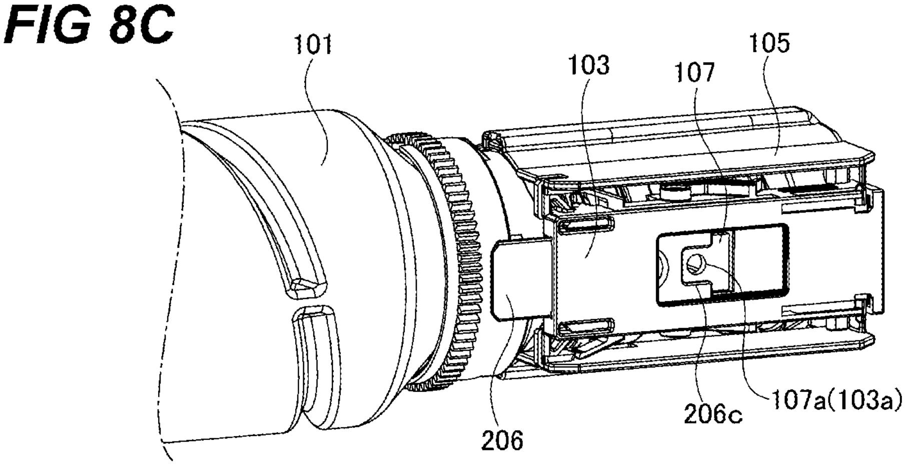

Namely, the container shutter 206 is movable between the sealing position (FIG. 8A), the replenishing position (FIG. 8B), and the filling position (FIG. 8C).

The container shutter 206 has the stopper portions (held portions) 206*d*, 206*e* (see FIG. 8A), which are held by the shutter stopper portions 31, 32 (see FIG. 3) of the developer replenishing device 3 during mounting/removing operations of the developer replenishing container 4 so that the developer replenishing container 4 can move relative to the container shutter 206.

The first stopper portion 206*d* engages the first shutter stopper portion 31 of the developer replenishing device 3 during the mounting operation of the developer replenishing container 4 to fix the position of the container shutter 206 relative to the developer replenishing device 3. The second stopper portion 206*e* engages the second shutter stopper portion 32 of the developer replenishing device 3 during the removing operation of the developer replenishing container 4.

As shown in FIG. 8A, the container shutter 206 is in a sealing state in which the supply opening 103*a* (seal opening 107*a*) does not communicate with the shutter opening 206*a* when the developer replenishing container 4 is not mounted on the image forming apparatus 1. Namely, in this sealing state, the container shutter 206 is in the sealing position where the sealing portion, which has no opening as shown in FIG. 8A, faces the supply opening 103*a* and the seal opening 107*a*, so that the supply opening 103*a* (seal opening 107*a*) does not communicate with the shutter opening 206*a*.

When the developer replenishing container 4 is not mounted on the image forming apparatus 1, the container shutter 206 is engaged by a configuration member that maintains the state between the container shutter 206 and the container frame 103 so that the container shutter 206 is held such that the container shutter 206 does not move from the sealing position (sealing state) shown in FIG. 8A.

In the process of mounting the developer replenishing container 4, the first stopper portion 206*d* of the container shutter 206 engages the first shutter stopper portion 31 of the mounting portion 22 to fix the position of the container shutter 206 with respect to the developer replenishing device 3. As a result, the container shutter 206 is disengaged from the configuration member and moves in the axial direction relative to the developer replenishing container 4, and becomes in the discharging state in which the supply opening 103*a* (seal opening 107*a*) communicates with the shutter opening 206*a* as shown in FIG. 8B. Namely, the shutter opening 206*a* of the container shutter 206 is moved to the replenishing position (see FIG. 8B) where the shutter opening 206*a* faces the supply opening 103*a* and the seal opening 107*a* so that the supply opening 103*a* (seal opening 107*a*) communicates with the shutter opening 206*a* in the discharging state. As a result, the developer can be supplied from the developer replenishing container 4 to the developer replenishing device 3.

During the removing operation of the developer replenishing container 4, the container shutter 206 is moved to the sealing position (sealing state) shown in FIG. 8A by the second stopper portion 206*e* engaging with the second shutter stopper portion 32 of the developer replenishing device 3, and is held in the sealing position (sealing state).

The used developer replenishing container 4 is collected refilled with the developer to reuse the developer replenishing container 4. When the developer replenishing container 4 (developer container 101) is to be refilled, the container shutter 206 is moved using, for example, a jig (not shown) to be in the state for refilling so that the recessed portion 206*c* faces the supply opening 103*a* (seal opening 107*a*) as shown in FIG. 8C. Namely, the container shutter 206 is moved to the filling position (see FIG. 8C) where the recessed portion 206*c* faces the supply opening 103*a* and the seal opening 107*a*, so that the supply opening 103*a* (seal opening 107*a*) faces the recessed portion 206*c*. This allows the developer to be refilled into the developer replenishing container 4.

According to Embodiment 2, by moving the container shutter 206 to the filling position shown in FIG. 8C, the recessed portion 206*c* faces the supply opening 103*a* (seal opening 107*a*). As a result, it is possible to refill the developer replenishing container 4 with developer from the supply opening 103*a* (seal opening 107*a*). This eliminates the process of disassembling the developer replenishing container 4, so that the steps and costs for reuse are minimized when the developer replenishing container is reused by refilling it with the developer.

This Embodiment 1 exemplifies the configuration in which the container shutter 206 has the recessed portion 206*c* and the container shutter 206 is movable to the filling position (see FIG. 8C) where the recessed portion 206*c* faces the supply opening 103*a*. However, the invention is not limited to this configuration. Another configuration may be adopted in which a container shutter has a shutter opening that can communicate with the supply opening and the shutter is retreated (moved) to the position where the supply opening is exposed.

Embodiment 3

Next, the developer replenishing container according to Embodiment 3 will be described using FIGS. 9A, 9B, 9C, 10 and 11. The configuration of the image forming apparatus 1 including the developer replenishing device 3 is the same as that in Embodiment 1 described above, so the description thereof will be omitted. Further, the configuration of the developer replenishing container is also the same as that of Embodiment 1 described above, except for the configuration described below, so the same reference symbols will be attached to the components with equivalent functions and the description thereof will be omitted.

(Configuration of Container Shutter of Developer Replenishing Container)

The developer replenishing container 4 according to Embodiment 3 has the container shutter 106 described in Embodiment 1.

Furthermore, the container frame 103 (developer replenishing portion) of the developer replenishing container 4 in this Embodiment has the filling opening 103*c* that can communicate with the outside. The filling opening103*c* is provided separately from the supply opening 103*a*, which can communicate with the shutter openings 106*a*, 106*b* of the container shutter 106 and is formed such that the opening width of the filling opening103*c* is larger than that of the supply opening 103*a*.

The developer replenishing container 4 has the sealing sticker 108, which is a sealing member for sealing the filling opening 103*c* such that the developer replenishing container 4 does not communicate with the outside. The filling opening 103*c* of the developer replenishing container 4 is normally sealed by the sealing sticker 108 so that the developer replenishing container 4 does not communicate with the outside.

Figure 9A:
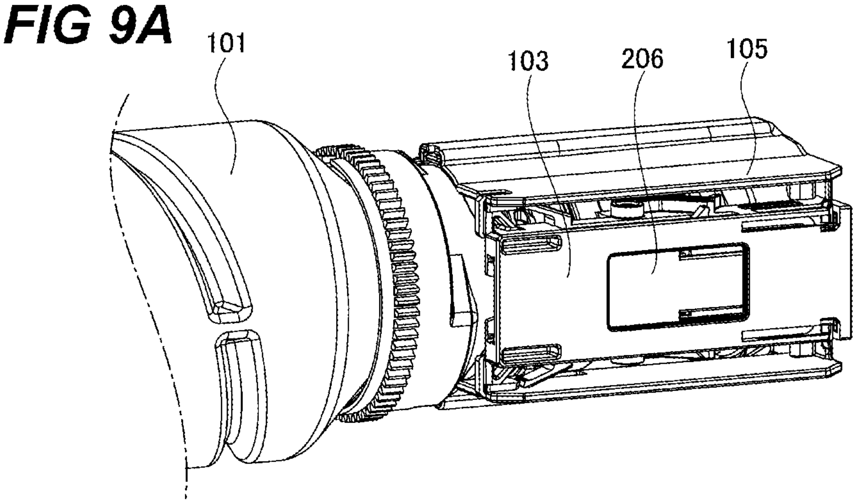
FIGS. 9A, 9B and 9C are a diagram showing an external view of the developer replenishing container according to Embodiment 3.
Figure 9B:
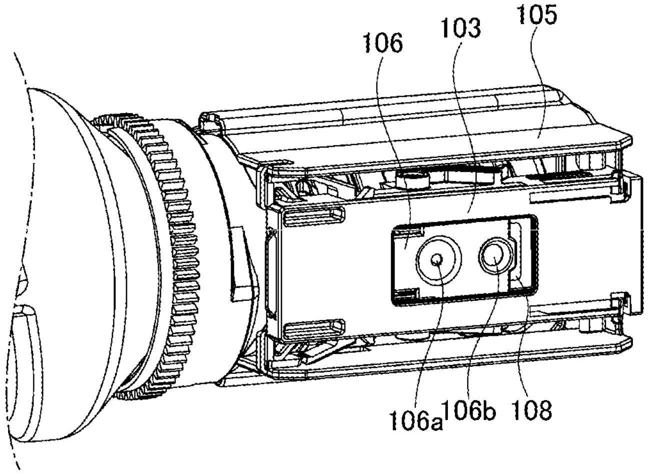

The sealing position (sealing state) shown in FIG. 9A and the replenishing position (discharging state) shown in FIG. 9B of the container shutter 106 are similar to the sealing position (sealing state) shown in FIG. 7A and the replenishing position (discharging state) shown in FIG. 7B described in Embodiment 1, respectively, so the description thereof will be omitted.

Next, the steps of reusing the developer replenishing container 4 will be described, in which the used developer replenishing container 4 is collected and refilled with developer.

The collected developer replenishing container 4 is reused through the step of moving the container shutter 106 to the filling position (FIG. 9C) and the step of filling the developer replenishing container 4 with developer in the state where the container shutter 106 is moved to and kept at the filling position.

Figure 9C:
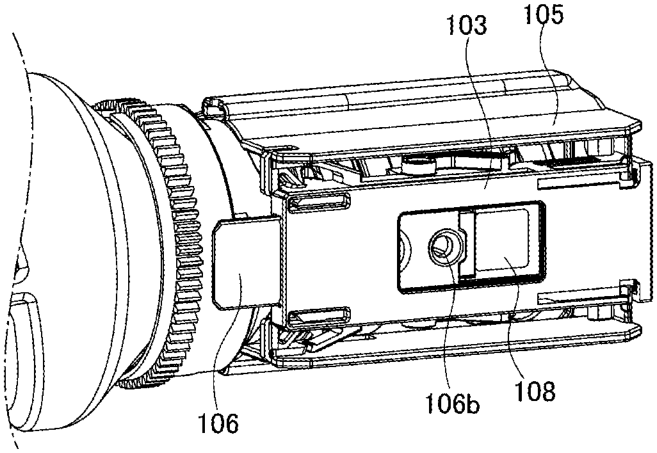

Specifically, when the developer replenishing container 4 (developer container 101) is to be refilled, the container shutter 106 is moved using, for example, a jig (not shown) to the position indicated in FIG. 9C. Namely, the container shutter 106 is moved to the position (see FIG. 9C) where the shutter opening 106*b* faces the supply opening 103*a* and the seal opening 107*a*.

Figure 10:
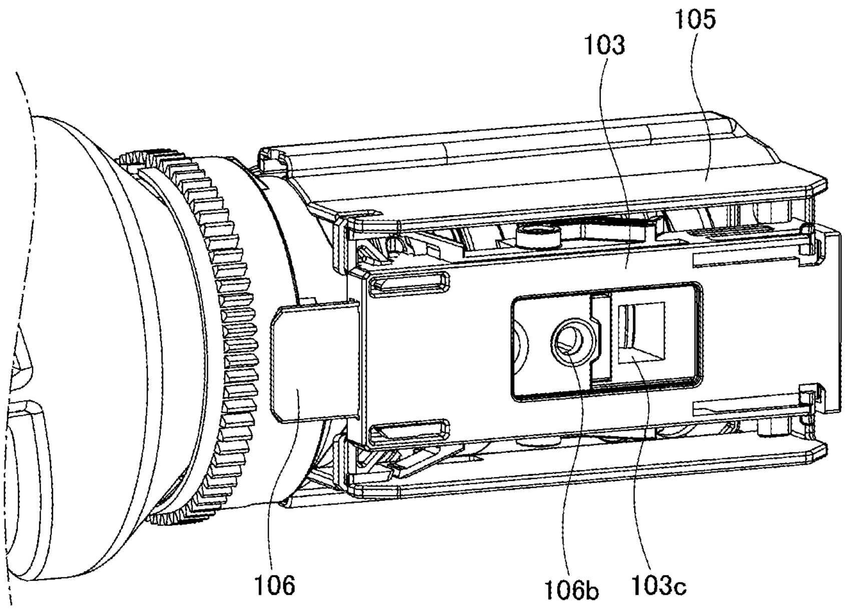
FIG. 10 is a diagram showing an external view of the developer replenishment container without a sealing sticker according to Example 3.
Figure 11:
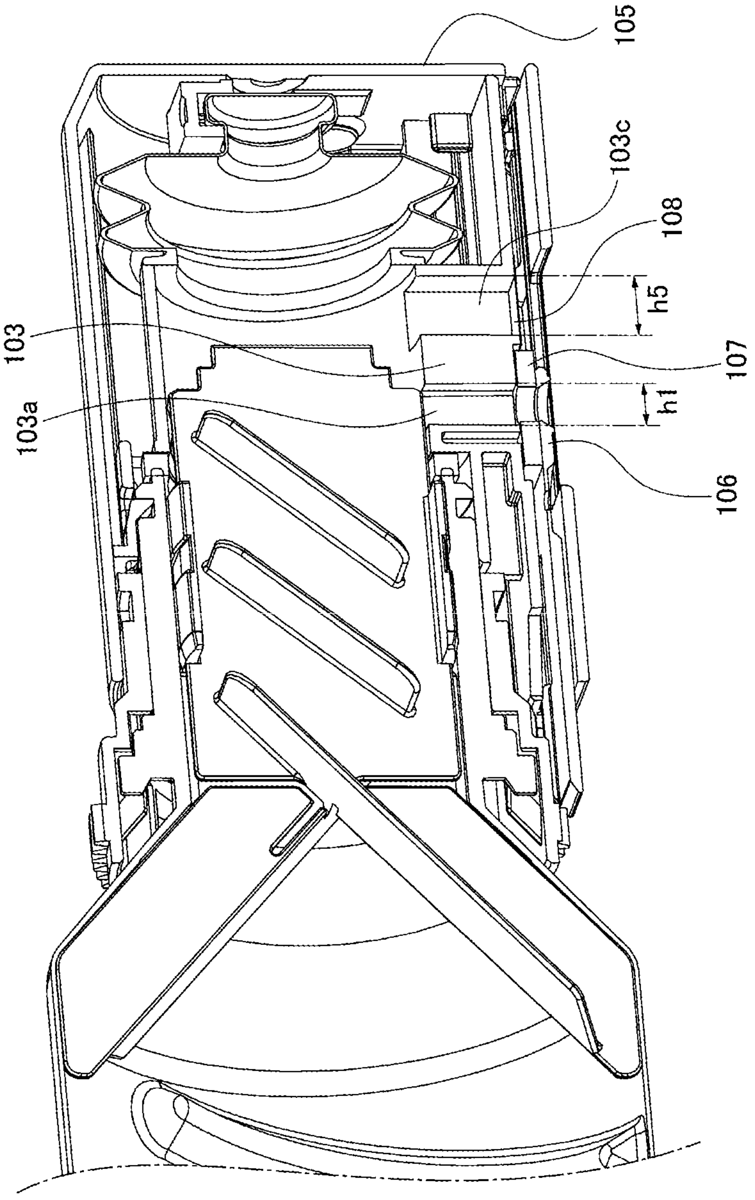
FIG. 11 is a diagram showing a cross-sectional view of the vicinity of a container frame of the developer replenishing container according to Example 3.

As described above, when the container shutter 106 is moved to the filling position shown in FIG. 9C, the sealing sticker 108 is exposed. The sealing sticker 108 is affixed to the developer replenishing container 4 to cover the filling opening 103*c*, which is provided separately from the supply opening 103*a*. When the container shutter 106 is moved to the filling position described above, the sealing sticker 108 is largely exposed from the container shutter 106 and can be peeled off. When the sealing sticker 108 is peeled off from the developer replenishing container 4, the filling opening 103*c* is exposed, as shown in FIG. 10. As a result, the developer replenishing container 4 can be refilled with developer from the filling opening 103*c*.

The container frame 103 is configured such that the opening width h5 of the filling opening 103*c* is larger than the opening width h1 of the supply opening 103*a*.

Namely, the opening width h5 of the filling opening 103*c*>the opening width h1 of the supply opening 103*a*.

After the developer has been completely refilled, the sealing sticker 108 is affixed to seal the filling opening 103*c*. This makes it possible to refill the developer while minimizing parts replacement, even when a small diameter shutter opening is used to prevent contamination.

Embodiment 4

Next, the developer replenishing container according to Embodiment 4 will be described using FIGS. 12A, 12B, 12C and 13. The configuration of the image forming apparatus 1 including the developer replenishing device 3 is the same as that in Embodiment 1 described above, so the description thereof will be omitted. Further, the configuration of the developer replenishing container is also the same as that of Embodiment 1 described above, except for the configuration described below, so the same reference symbols will be attached to the components with equivalent functions and the description thereof will be omitted.

(Configuration of Refill History Management)

The configurations of Embodiments 1 to 3 enable the refilling of the developer with a smaller number of steps and less cost for reuse. However, when refilling is repeated, parts could be deteriorated. Therefore, this Embodiment is configured to efficiently promote reuse by detecting that refilling has been performed in a simple manner.

Figure 12A:
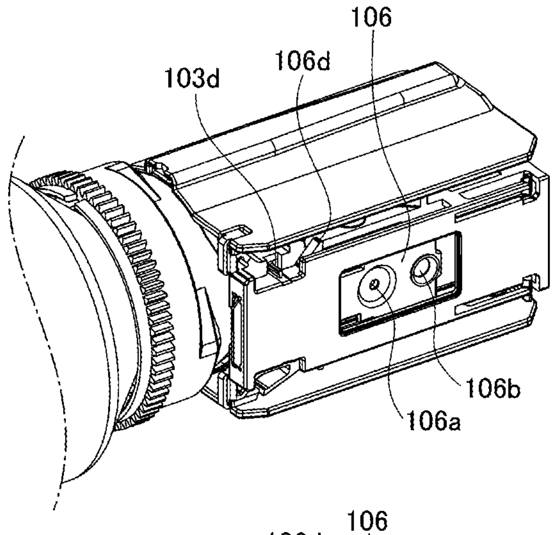
FIGS. 12A, 12B and 12C are an external view of the vicinity of a detection portion of the developer replenishing container.
Figure 12B:
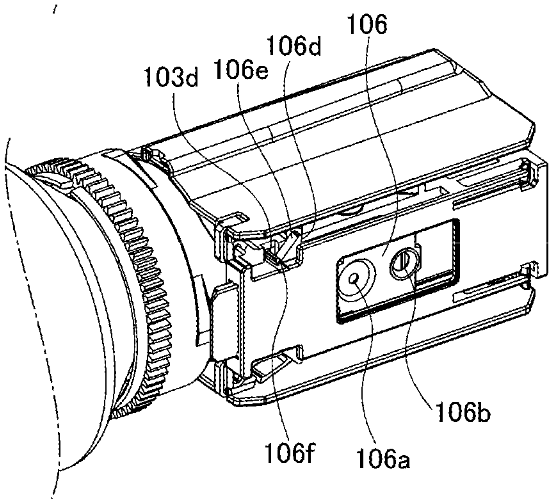
Figure 12C:
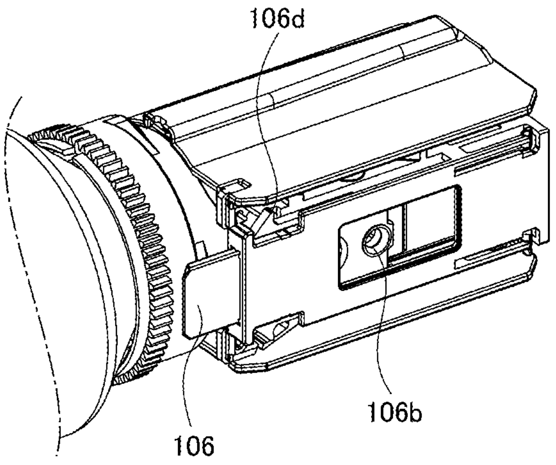

As shown in FIG. 12A, the developer replenishing container 4 according to this Embodiment 4 is equipped with the detection portion 103*d* to detect that the developer replenishing container 4 has been reused. The developer replenishing container 4 also has the contact portion 106*f* that contacts the detection portion 103*d* to remove the detection portion 103*d* as the container shutter 106 moves from the sealing position shown in FIG. 12A or the replenishing position shown in FIG. 12B to the filling position shown in FIG. 12C.

The detection portion 103*d* is positioned so as to contact the contact portion 106*f* provided on the container shutter 106 when the container shutter 106 is moved from the sealing position or replenishing position to the filling position.

The contact portion 106*f* is a part of the stopper portions 106*d* and 106*e* (held portion) integrally formed on the container shutter 106. The contact portion 106*f* is held by the developer replenishing device 3 during the mounting and removing operations of the developer replenishing container 4.

Figure 13:
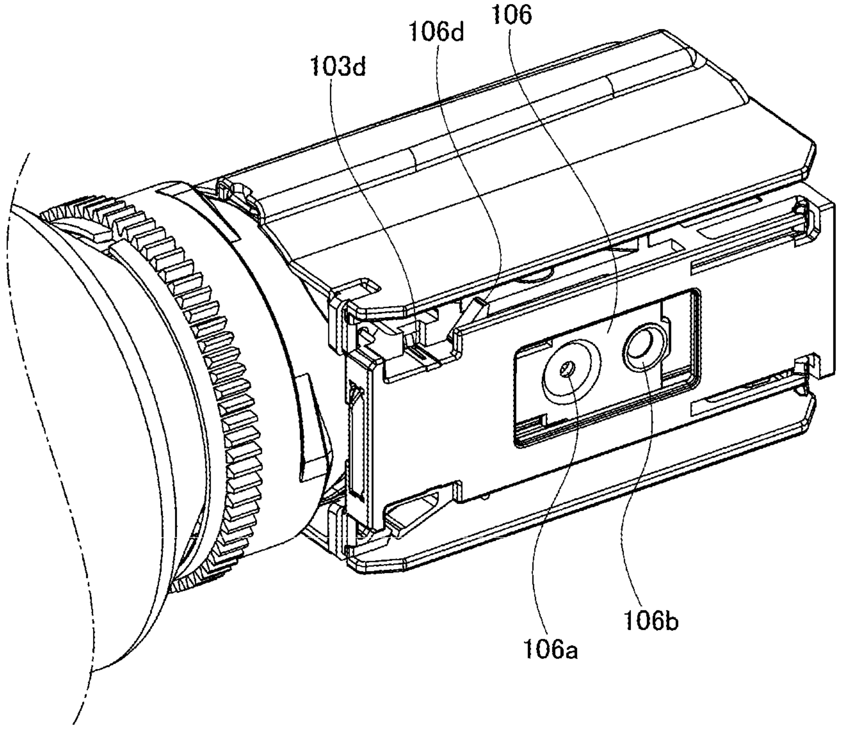
FIG. 13 an external view of the vicinity of a detection portion of the developer replenishing container in the state where the detection portion is missing.

The rib at the tip of the detecting portion 103*f* of the container frame 103 is removed from the container frame 103 by the contact portion 106*f* of the container shutter 106 during the movement of the container shutter 106 to the filling position. Therefore, when the container shutter 106 is moved to the filling position, the rib at the tip of the detection portion 103*d* becomes missing (removed) from the container frame 103 as shown in FIG. 13.

Therefore, the developer replenishing container 4 according to this Embodiment first determines whether the developer replenishing container 4 has been reused or not according to the presence or absence of the rib of the detection portion 103*d*. If this step determines that the rib is present in the detection portion 103*d* so that the developer replenishing container has not been reused, the process moves to the step of moving the container shutter to the filling position. Thereafter, when the developer refilling step is carried out as described above and the developer replenishing device is reused.

On the other hand, if the above step determines that the rib of the detection portion 103*d* is missing and that the developer replenishing container has been reused, the process may move to the step of replacing parts, etc. if necessary.

It is possible to manage the history of refilling of the developer replenishing container by determining the presence or absence of the rib of the detection portion 103*d*. As a result, the replacement of parts of the developer replenishing container when it is repeatedly filled. With this configuration, the condition the usage of parts can be determined by a simple method and the developer replenishing container can be refilled using a minimum amount of replacement parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-201768, filed Dec. 19, 2022, which is hereby incorporated by reference herein in its entirety.

What is claimed is:

1. A developer replenishing container configured to be detachably attachable to a developer replenishing device and to replenish developer via the developer replenishing device, the developer replenishing container comprising:

a developer replenishing portion with a replenishing opening; and a shutter with at least one shutter opening that can communicate with the replenishing opening, the shutter being configured to open and close the replenishing opening according to attaching and detaching operations of the developer replenishing container, wherein the shutter is movable between a sealing position where the replenishing opening is sealed, a replenishing position where the shutter opening faces the replenishing opening to replenish developer from the developer replenishing container, and a filling position where the developer replenishing container is filled with developer without sealing the replenishing opening.

2. The developer replenishing container according to claim 1, wherein the shutter has a first shutter opening that can communicate with the replenishing opening and a second shutter opening that can communicate with the replenishing opening, a diameter of the second shutter opening being larger than that of the first shutter opening, and wherein the shutter is movable between the sealing position where the replenishing opening is sealed, the replenishing position where the first shutter opening communicates with the replenishing opening, and the filling position where the second shutter opening communicates with the replenishing opening.

3. The developer replenishing container according to claim 2, further comprising:

an elastic member provided between the developer replenishing portion and the shutter to seal a space between the developer replenishing portion and the shutter, the elastic member having a seal opening that communicates with the replenishing opening, wherein a diameter of the seal opening is smaller than that of the second shutter opening.

4. The developer replenishing container according to claim 3, wherein an opening width of the replenishing opening is larger than an opening width of the seal opening, and the opening width of the seal opening is larger than an opening width of the second shutter opening.

5. The developer replenishing container according to claim 3, wherein a diameter on a developer replenishing portion side, of the second shutter opening is larger than a diameter on an opposite side, of the second shutter opening.

6. The developer replenishing container according to claim 1, wherein the shutter has a shutter opening that can communicate with the replenishing opening and a recessed portion of the shutter, and wherein the shutter is movable between the sealing position where the replenishing opening is sealed, the replenishing position where the shutter opening communicates with the replenishing opening, and the filling position where the recessed portion that is recessed inwardly of the shutter faces the replenishing opening.

7. The developer replenishing container according to claim 1, wherein the developer replenishing portion has a filling opening that can communicate with the outside of the developer replenishing container separately from the replenishing opening that can communicate with the at least one shutter opening of the shutter, an opening width of the filling opening is larger than that of the replenishing opening.

8. The developer replenishing container according to claim 7, further comprising:

a sealing member for sealing the filling opening so as for the filling opening not to communicate with the outside of the developer replenishing container, wherein the filling opening is normally sealed by the sealing member.

9. The developer replenishing container according to claim 8, wherein the sealing member is a sealing sticker that is affixed to the developer replenishing container such that the sealing sticker covers the filling opening, and wherein the sealing sticker can be peeled off when the shutter is moved to the filling position.

10. The developer replenishing container according to claim 1, further comprising:

a detection portion configured to detect that the developer replenishing container has been reused, and a contact portion configured to remove the detection portion by contacting the detection portion when the shutter is moved to the filling position.

11. The developer replenishing container according to claim 10, wherein the contact portion is a part of a held portion integrally formed with the shutter, the held portion being held to the developer replenishing device when the developer replenishing container is attached and detached.

12. A method of reusing a developer replenishing container configured to be detachably attachable to a developer replenishing device, and to replenish developer via the developer replenishing device, the developer replenishing container including:

a developer replenishing portion with a replenishing opening; and a shutter with at least one shutter opening that can communicate with the replenishing opening, the shutter being configured to open and close the replenishing opening according to attaching and detaching operations of the developer replenishing container, wherein the shutter is movable between a sealing position where the replenishing opening is sealed, a replenishing position where developer is replenished from the developer replenishing container via the replenishing opening, and a filling position where the developer replenishing container is filled with developer via the replenishing opening, wherein the method comprises the steps of:

moving the shutter of the developer replenishing container to the filling position, and filing the developer replenishing container with developer with the shutter being located at the filling position.

13. The method of reusing a developer replenishing container, according to claim 12, wherein the developer replenishing container includes:

a detection portion configured to detect that the developer replenishing container has been reused, the detection portion being provided on a developer replenishing portion, and a contact portion provided on the shutter, the contact portion being configured to remove the detection portion by contacting the detection portion when the shutter is moved from the sealing position to the filling position, and wherein the method further comprises the steps of:

determining whether the developer replenishing container has been reused or not according to presence or absence of the detection portion, and moving the shutter to the filling position after it is determined that the detection portion is present and the developer replenishing container has not been reused.

* * * * *